United States Patent [19]
Andersen

[11] Patent Number: 5,647,399
[45] Date of Patent: Jul. 15, 1997

[54] FLOW CONTROL DEVICE

[75] Inventor: Goeran Peter Andersen, Troy, Mich.

[73] Assignee: Valeo Climate Control Inc., Rochester Hills, Mich.

[21] Appl. No.: 510,781

[22] Filed: Aug. 3, 1995

[51] Int. Cl.⁶ ............... F16K 11/20; F16K 31/04; F16K 31/53
[52] U.S. Cl. ............... 137/637.3; 251/129.11; 251/250.5; 251/304
[58] Field of Search ............... 137/637.3; 251/250.5, 251/304, 129.11, 305; 74/89.18, 431, 433, 434, 435; 454/143

[56] References Cited

U.S. PATENT DOCUMENTS

| | | | |
|---|---|---|---|
| 958,313 | 5/1910 | Riordan | 137/637.3 |
| 988,504 | 4/1911 | Pride | 137/637.3 |
| 1,574,435 | 2/1926 | Martin | 137/637.3 |
| 2,209,397 | 7/1940 | Gannestad | 137/637.3 |
| 2,491,429 | 12/1949 | Thomas, Sr. | 137/637.3 |
| 3,633,626 | 1/1972 | Zirps et al. | 137/637.3 |
| 3,934,851 | 1/1976 | Illing | 137/637.3 |
| 4,656,926 | 4/1987 | Bauer et al. | 251/250.5 |
| 5,036,816 | 8/1991 | Mann | 137/637.3 |
| 5,050,638 | 9/1991 | Zeller et al. | 251/250.5 |

*Primary Examiner*—George L. Walton
*Attorney, Agent, or Firm*—Morgan & Finnegan, L.L.P.

[57] ABSTRACT

A flow control device including first and second flow control members, first and second actuators, and first and second transmission devices wherein both flow control members are adapted for rotation about a common axis. The first flow control member has a wall portion which defines an aperture aligned with the common axis. The second transmission device includes a shaft member which passes through the aperture for rotation therein. A first end of the shaft member is coupled to the second actuator and a second end of the shaft member is coupled to the second flow control member. The first transmission device includes a first rotary body coupled to the first flow control member and rotatable about the common axis and a second rotary body coupled to the first actuator and rotatable about a second axis offset from the common axis. The first and second rotary bodies are engagable by a mechanism such that rotation of the first rotary body causes rotation of the second rotary body. The second actuator selectively rotates the shaft member thereby rotating the second flow control member about the common axis and the first actuator selectively rotates the first and second rotary bodies, thereby rotating the first flow control member about the common axis.

18 Claims, 4 Drawing Sheets

FLOW CONTROL DEVICE

FIELD OF THE INVENTION

The present invention relates to a flow control device, and more particularly but not exclusively to a flow control device for temperature control in a motor vehicle having an air conditioning system.

BACKGROUND TO THE INVENTION

Passenger vehicles, and especially automobiles, are frequently provided with air conditioning systems. When such systems were first introduced, it was felt sufficient to provide overall control of the temperature within the vehicle. However, it has been found desirable to provide so-called "zoning" of temperature so that the driver and passenger each has independent control of the temperature in their respective zones.

It is known to provide an air distribution device approximately on the center-line of the vehicle underneath the instrument panel. This central location facilitates the provision of outputs to either side, namely to the driver and passenger. It is also known to operate the flow control members in the flow control device using control cables. However, such control cables require maintenance, and are otherwise undesirable. It is has therefore become desirable to instead operate the flow control members from electrical actuators.

One problem with the use of electrical actuators is the requirement to provide good access to the electrical actuators for servicing. The need for such good access dictates that sufficient space must be allowed in the vicinity of the actuator to give adequate room for servicing. Hence, if two actuators are provided, one on each side of a flow control device, there would be the need for space on both sides of the flow control device to allow for servicing of the actuators.

Accordingly it is desirable to provide a flow control device in which the flow control members are operated by actuators which may be on the same side of the flow control device.

SUMMARY OF THE INVENTION

According to a first aspect of the present invention there is provided a flow control device comprising first and second flow control members, first and second actuators, and first and second transmission devices, both flow control members being adapted for rotation about a common axis, and each transmission device coupling a respective actuator to a respective flow control member, the first flow control member having a wall portion defining an aperture aligned with said common axis, the second transmission device comprising a shaft member passing through the aperture for rotation thereby of the second flow control member, wherein the first transmission device has a first rotary body rotatable about said common axis and a second rotatable body rotatable about a second rotation axis offset from said common axis, and engagement means extending between the first and second rotary bodies, whereby rotation of the second rotary body about the second rotation axis is coupled to the first flow control member.

According to a second aspect of the present invention there is provided a flow control device comprising first and second flow control members, first and second actuators, and first and second transmission devices, both flow control members being adapted for rotation about a common axis, each transmission device coupling a respective actuator to a respective flow control member, the first flow control member having a wall portion defining an aperture aligned with said common axis, the second transmission device comprising a shaft member passing through the aperture for rotation thereof of the second flow control member wherein the first transmission device has a first rotary body having a first toothed sector mounted coaxially with said common axis, and a second rotary body having a second toothed sector with a rotation axis offset from said common axis, said first and second toothed sectors being mutually engageable whereby rotation of the second rotary body is coupled to the first flow control member.

In one embodiment the first rotary body is integral with the first flow control member.

Alternatively the wall portion of the first flow control member further defines a socket region and the first rotary body has a portion extending parallel to the common axis for engagement with the wall portion in the socket region.

Conveniently the first rotary body is releasably secured to the first flow control member.

Preferably the second actuator has a rotary output portion and the rotary output portion of the second actuator defines an actuator socket portion adapted to engage an end portion of the shaft member.

Advantageously the first actuator has a rotary output portion and the rotary output portion of the first actuator defines a coupling portion adapted to engage a corresponding portion of the second rotary body.

Conveniently the second rotary body has wall portions defining a second body socket portion which forms said corresponding portion.

Preferably both of the first and second actuators comprise an electric motor.

Advantageously each electric motor is a step-by-step operable motor.

BRIEF DESCRIPTION OF THE DRAWINGS

An embodiment of the invention will now be described with reference to the accompanying drawings in which.

DESCRIPTION OF THE PREFERRED EMBODIMENT

Figure 1:
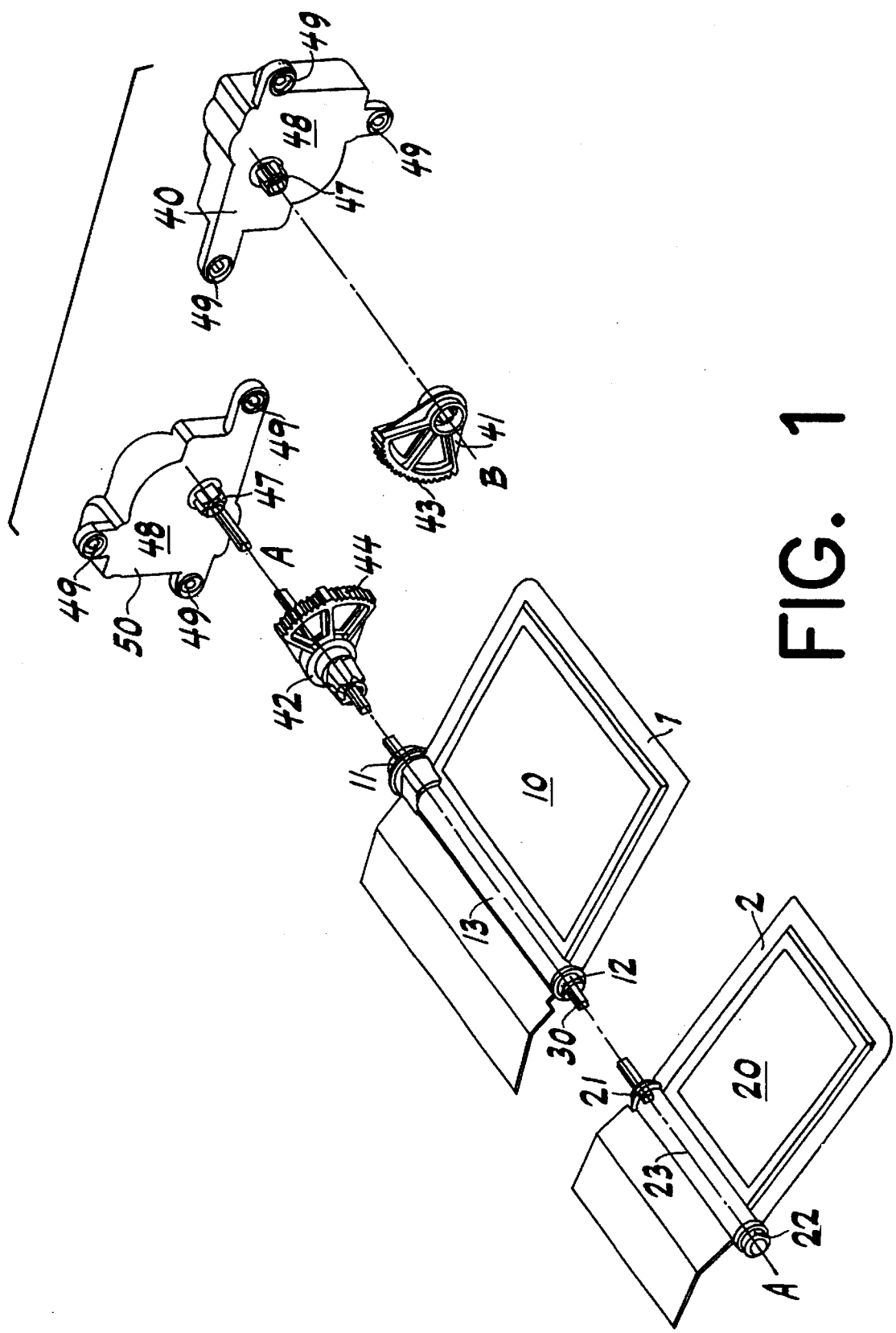
FIG. 1 shows an assembly drawing of an embodiment of a flow control device in accordance with the present invention.
Figure 2:
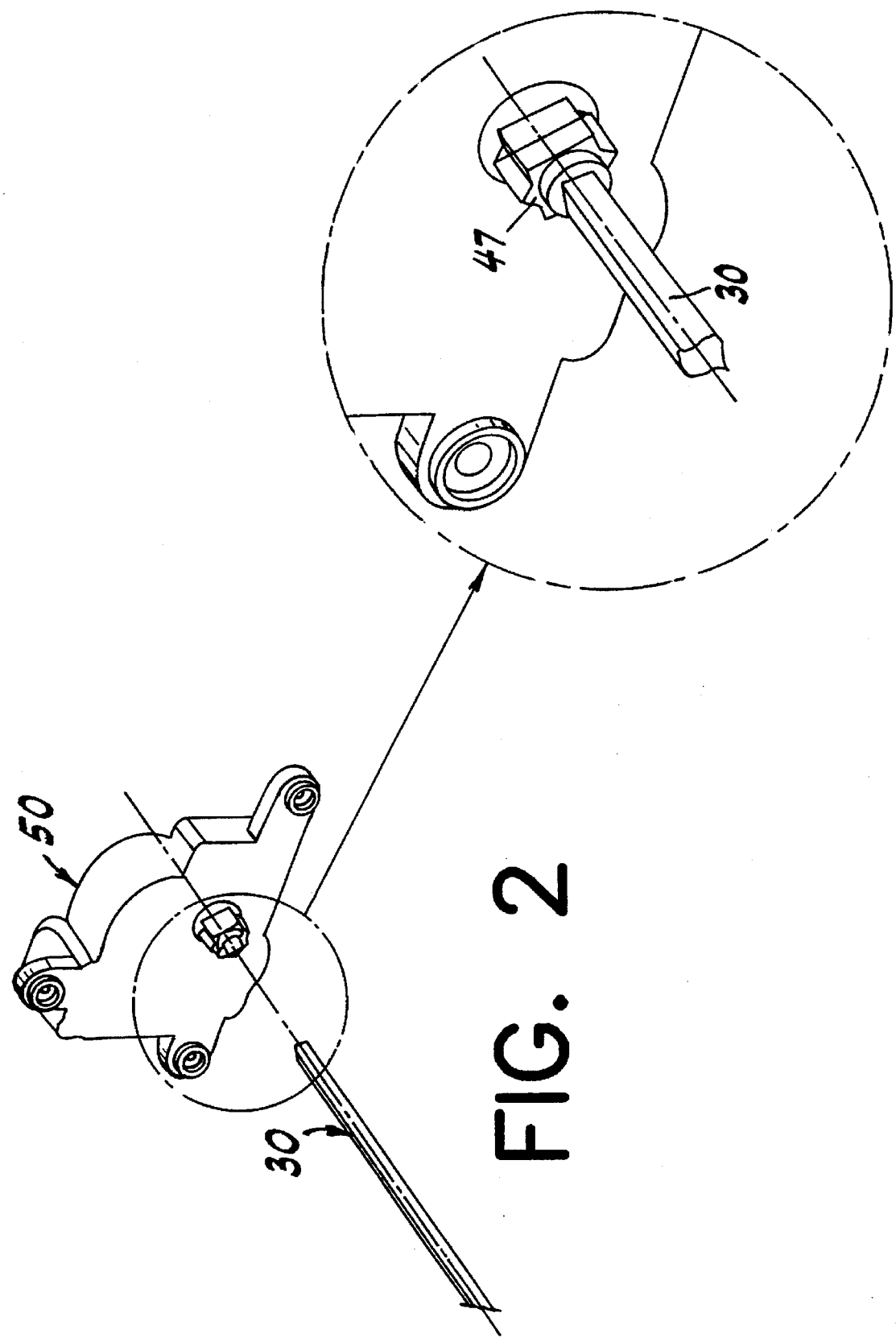
FIG. 2 shows the attachment of the shaft member to the second actuator.

Referring now to FIG. 1, a flow control device of the present invention has first and second flow control members 1 and 2, these flow control members being known in the art as "dampers" or "doors".

The orientation of the first flow control member is controlled separately from the orientation of the second flow control member by a first actuator 40 which is coupled to the first flow control member 1 via a first transmission device. The first transmission device includes a first rotary body 41, rotatable about an axis B, and a second rotary body 42 rotatable about an axis A. The second rotary body 42 as coupled to the first flow control member 1 and to the first rotary body via engagement means 43, 44. In the present embodiment, the engagement means consists of a first toothed sector 43 mounted on the first rotary body 41, and a second toothed sector 44 mounted on the second rotary body 42. The two toothed sectors are mutually engaged, so that rotation of the first rotary body 41 is transmitted to the first flow control member 1.

The first and second flow control members 1 and 2 are rotatable about a common axis A—A and are supported by bearing portions 11, 12 and 21, 22 along the axis wherein the bearing portions cooperate with journals in an associated housing, not shown. The first and second flow control members 1,2 may be made of metal, but conveniently they are made of a plastic material.

The first flow control member 1 comprises a generally planar flat portion 10 secured to a hub portion 13 which consists of a circular-cylindrical wall portion defining a central aperture.

The second flow control member 2 likewise has a generally planar flat portion 20 and a hub portion 23. The hub portion 23 is a generally solid cylindrical body. A suitably dimensioned shaft member 30 passes through the aperture defined by the circular-cylindrical wall portion of the hub portion 13 of the first flow control member, and engages with the hub portion 23 of the second flow control member 2. In the presently described embodiment, the shaft member 30 has a generally square cross section and the hub portion 23 is provided with a corresponding counterpart square aperture for an end portion of the shaft member 30. It will of course be understood that shaft members 30 having different cross sections could be used alternatively, in which case the corresponding counterpart aperture in the hub portion 23 of the second flow control member would be adapted accordingly.

Figure 3:
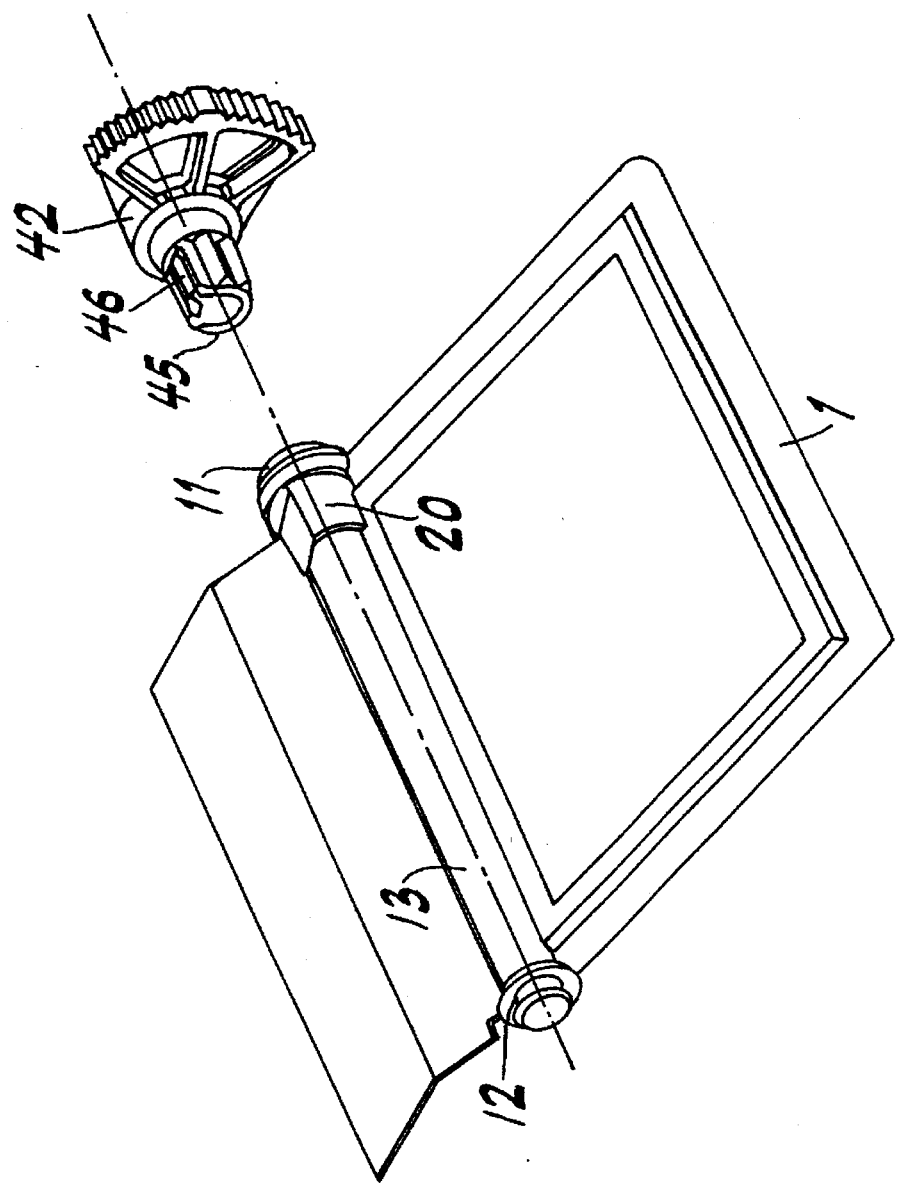
FIG. 3 shows the coupling between the first rotary body and the first flaw control member.

As mentioned above, the shaft member 30 is "suitably dimensioned". By "suitably dimensioned" it is intended that the shaft member 30 is sufficiently small to freely rotate within the hub portion 13 of the first flow control member. The bearing portion 12 of hub portion 13 of the first flow control member 1 is directed towards, and adjacent to, the bearing portion 21 of the hub portion 23 of second flow control member 2. As can best be seen in FIG. 3, the end of hub portion 13 opposite to the second bearing surface 12, in other words that end which carries the first bearing portion 11, is somewhat enlarged in the region of the first bearing portion 11, so as to define a socket region 20.

The second rotary body 42 has an axially-extending portion 45 which cooperates with the socket region 20 so that rotation of the second rotary body 42 entrains the first flow control member 1, in rotation.

In one embodiment, not shown, the portion 45 of the second rotary body 42 is secured in the socket region 20 by adhesive. However, in the presently described embodiment, the portion 45 is provided with a resilient latch-tongue portion 46 which cooperates with the socket to provide a releasable fastening. It will of course be understood that other arrangements could be provided, for example the hub portion 13 might instead be extended so as to provide an attachment for a socket formed in the second rotary body 42. Alternatively, the second rotary body 42 can be integrally formed with the first flow control member 1.

The form of the socket region 20 of the presently described embodiment preferably matches the form of the corresponding portion 45 of the second rotary body. In the specific embodiment described, the portion 45 of the second rotary body is generally star-shaped and the socket region 20 has walls which define an internal socket which conforms to this shape. Alternatively, other shapes could be provided, for example a regular hexagon.

Figure 4:
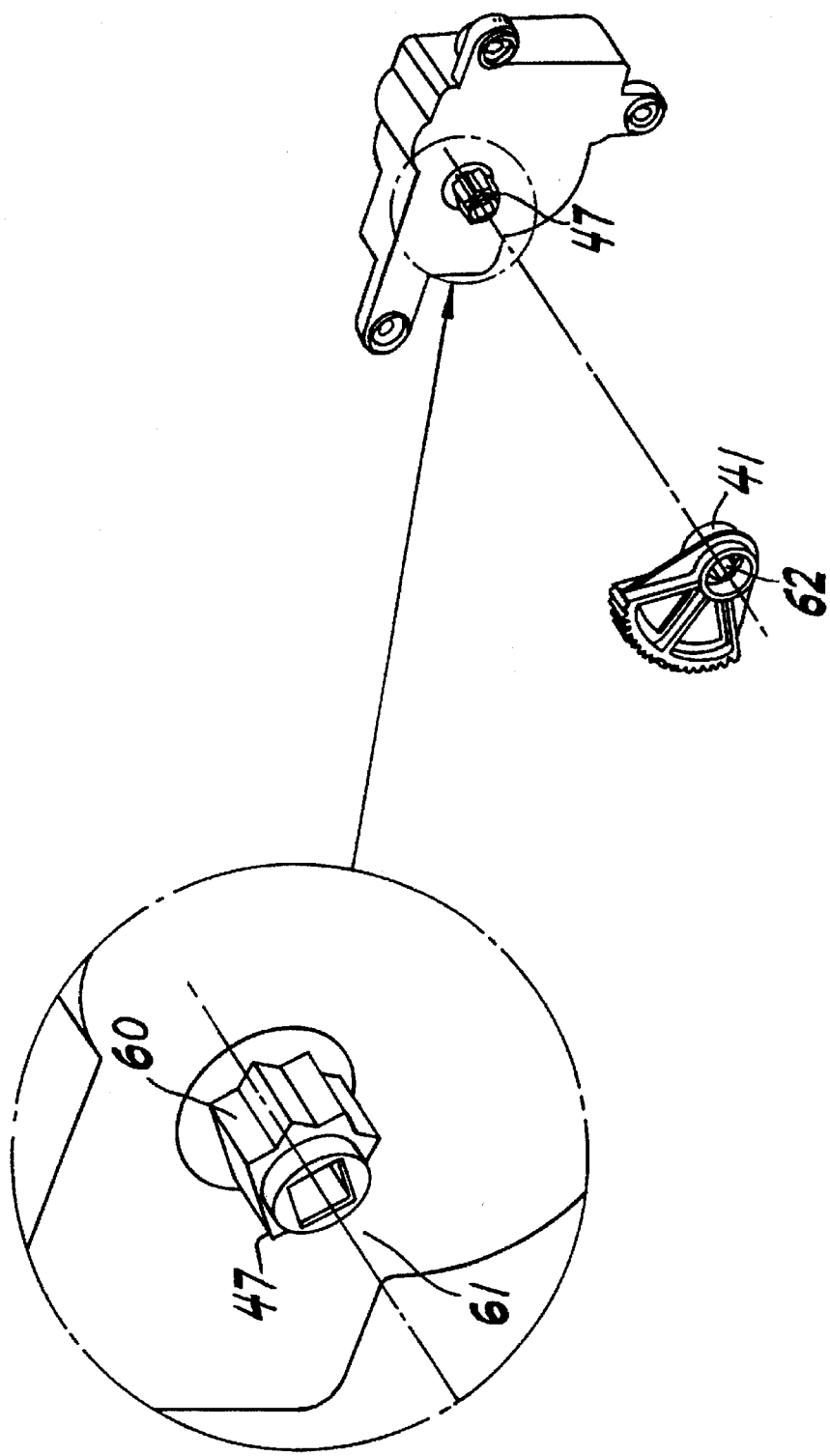
FIG. 4 shows the coupling between the first actuator and the second rotary body.

The first rotary body 41 is rotatable by a first electric actuator 40. The first electric actuator, as can be seen in FIG. 1, has a rotating output member 47 projecting from a planar face portion 48. Fixing holes 49 are provided for securing the first actuator 40 to a suitable structure. As best seen in FIG. 4, the rotary output member 47 has an outer wall 60 affording a generally star-shaped configuration and also affording a generally square socket 61. The first rotary body 41 has a counterpart socket 62 such that, in use, the first rotary body 41 is rotatingly disposed on the rotary output member 47 for rotation thereby. It will of course be understood that other configurations of the outer surface of the rotating output member 47, and the corresponding socket 62 of the first rotary member 41 could be provided.

The shaft member 30 is rotatable by a second electrical actuator 50, as best seen in FIG. 1. The Second actuator 50 in the present embodiment is identical to the first actuator 40. The end of the shaft member 30 remote from the second flow control member 2 is accordingly housed in the square socket 61 (see FIG. 4) of the rotary output member 47 of the second actuator 50.

The two electrical actuators 40,50 each include a respective electrical stepper motor, in other words an electric motor operable step-by-step. The output shaft of the electric motor is connected to the rotating output member 47 so that a rotating output member 47 is rotatable by a total of about 80°. Stepper motors are well known in the art and will not be described here in detail. The actuator includes a position sensing device for determining the rotary position of the rotary output member 47, and this may consist of a circuit board having a feedback strip.

To operate the actuator, wires pass from the actuators to a control device. The control device may be fully automatic, and thus responsive to thermostats, or alternatively may have hand-operated controls to enable the driver or passenger to adjust the temperature. In a typical vehicle installation, the control device is mounted in the vehicle instrument panel, and is accessible to both the driver and passenger.

In operation, the flow control device is installed so that the first flow control member 1 adjusts the supply of hot and cold air to the driver's side of the vehicle, and the second flow control member 2 adjusts the supply of hot and cold air to the passenger's side of the vehicle. When the passenger-side control is operated, the second actuator 50 rotates the shaft member 30 in the desired sense of rotation, so as to open or close the second control member 2. When the shaft member 30 rotates, there is no substantial contact with the first flow control member, whose position is thereby unaffected. When the driver-side control is operated, the first actuator 40 rotates the first rotating body 41, which via the two toothed-gear sectors 43,44 causes the second rotary body 42 to rotate, and in turn to rotate the first flow control member 1.

As can be seen from FIG. 1, the flow control device enables both the first and second actuator 40,50 to be mounted on the same side of the flow control device.

It will of course be appreciated that other engagement means may be provided between the first and second rotary bodies 41,42. For example two frictional surfaces may be provided on the rotary bodies, the two frictional surfaces engaging together; alternatively, a chain or drive belt could be provided to link the rotation of the first rotary body 41 to the second rotary body 42.

I claim:

1. A flow control device comprising first and second flow control members, first and second actuators, and first and second transmission devices, both flow control members being adapted for rotation about a common axis, the first flow control member having a wall portion defining an aperture aligned with said common axis, the second transmission device comprising a shaft member passing through the aperture for rotation therein, a first end of the shaft member being coupled to the second actuator and a second end of the shaft member being coupled to the second flow control member, the first transmission device having a first rotary body coupled to the first flow control member and rotatable about said common axis and a second rotary body coupled to the first actuator and rotatable about a second rotation axis offset from said common axis, said first and said second rotary bodies being mutually engageable by an engagement mechanism extending therebetween such that a rotation of the second rotary body causes a rotation of the first rotary body, wherein the second actuator selectively rotates the shaft member freely within the aperture of the first control member thereby rotating the second flow control member about said common axis and wherein the first actuator selectively rotates the second and first rotary bodies thereby rotating the first flow control member freely about said shaft member and said common axis.

2. The flow control device of claim 1 wherein the first rotary body is integral with the first flow control member.

3. The flow control device of claim 1 wherein the wall portion of the first flow control member further defines a socket region, and the first rotary body has a portion extending parallel to the common axis for engagement with the wall portion in the socket region.

4. The flow control device of claim 3 wherein the first rotary body is releasably secured to the first flow control member.

5. The flow control device of claim 1 wherein the second actuator has a rotary output portion, the rotary output portion of the second actuator defining an actuator socket portion adapted to engage the first end of the shaft member.

6. The flow control device of claim 1 wherein the first actuator has a rotary output portion, the rotary output portion of the first actuator defining a coupling adapted to engage a corresponding portion of the second rotary body.

7. The flow control device of claim 6 wherein the second rotary body has wall portions defining a second body socket portion which forms said corresponding portion.

8. The flow control device of claim 1 wherein both of the first and second actuators comprise an electric motor.

9. The flow control device of claim 8 wherein each electric motor is a step-by-step operable motor.

10. A flow control device comprising first and second flow control members, first and second actuators, and first and second transmission devices, both flow control members being adapted for rotation about a common axis, the first flow control member having a wall portion defining an aperture aligned with said common axis, the second transmission device comprising a shaft member passing through the aperture for rotation therein, a first end of the shaft member being coupled to the second actuator and a second end of the shaft member being coupled to the second flow control member, the first transmission device having a first rotary body mounted coaxially with said common axis and coupled to the first flow control member, the first rotary body having a first toothed sector, and a second rotary body coupled to the first actuator with a rotation axis offset from said common axis, the second rotary body having a second toothed sector, said first and said second toothed sectors being mutually engageable such that a rotation of the second rotary body causes a rotation of the first rotary body, wherein the second actuator selectively rotates the shaft member freely within the aperture of the first control member thereby rotating the second flow control member about said common axis and wherein the first actuator selectively rotates the second and first rotary bodies thereby rotating the first flow control member freely about said shaft member and said common axis.

11. The flow control device of claim 10 wherein the first rotary body is integral with the first flow control member.

12. The flow control device of claim 10 wherein the wall portion of the first flow control member further defines a socket region, and the first rotary body has a portion extending parallel to the common axis for engagement with the wall portion in the socket region.

13. The flow control device of claim 12 wherein the first rotary body is releasably secured to the first flow control member.

14. The flow control device of claim 10 wherein the second actuator has a rotary output portion, the rotary output portion of the second actuator defining an actuator socket portion adapted to engage the first end of the shaft member.

15. The flow control device of claim 10 wherein the first actuator has a rotary output portion, the rotary output portion of the first actuator defining a coupling adapted to engage a corresponding portion of the second rotary body.

16. The flow control device of claim 15 wherein the second rotary body has wall portions defining a second body socket portion which forms said corresponding portion.

17. The flow control device of claim 10 wherein both of the first and second actuators comprise an electric motor.

18. The flow control device of claim 17 wherein each electric motor is a step-by-step operable motor.

* * * * *